United States Patent [19]
Eichler

[11] Patent Number: 5,118,427
[45] Date of Patent: Jun. 2, 1992

[54] PROCESS AND APPARATUS FOR THE SEPARATION OF SOLIDS FROM SLIMY LIQUIDS BY MEANS OF PRESS SCREW SEPARATORS

[75] Inventor: Dietrich Eichler, Grosskarolinenfeld, Fed. Rep. of Germany

[73] Assignee: Fan Engineering GmbH, Sunninghausen, Fed. Rep. of Germany

[21] Appl. No.: 653,161

[22] Filed: Feb. 11, 1991

[30] Foreign Application Priority Data

Feb. 10, 1990 [DE] Fed. Rep. of Germany ....... 4004148

[51] Int. Cl.⁵ .............................................. B01D 17/06
[52] U.S. Cl. .................................. 210/748; 210/770; 210/788; 210/145; 210/197; 210/414; 210/415; 100/45; 100/117
[58] Field of Search ............... 210/770, 768, 204, 415, 210/767, 230, 414, 788, 145, 197, 748, 744, 770, 788, 197, 145, 414, 415; 100/145, 117, 45, 30, 45, 117

[56] References Cited

U.S. PATENT DOCUMENTS

| | | | |
|---|---|---|---|
| 3,235,087 | 10/1962 | Andreus et al. | 210/415 |
| 4,214,377 | 7/1980 | Maffet | 210/767 |
| 4,915,830 | 4/1990 | Mackay et al. | 210/414 |
| 4,997,578 | 3/1991 | Berggren | 210/770 |
| 5,009,795 | 4/1991 | Eichler | 210/744 |

OTHER PUBLICATIONS

Article: "Verfahrenstechnik des Separierens von Flussigmist" Federal Institution for Agriculture, Braunschweig-Volkenrode, published in Grundle. Latechnik, vol. 37 (1987), No. 3, pp. 98–108.

Article: "Barn Manure", Dr. Josef Boxberger et al. Journal Series for Concrete Construction, Beton Publishing Co. (1988) pp. 102–106.

*Primary Examiner*—W. Gary Jones
*Assistant Examiner*—Ana Fortuna
*Attorney, Agent, or Firm*—Burns, Doane, Swecker & Mathis

[57] ABSTRACT

Slimy liquids, such as slimy manure, are passed through a press screw separator to separate the solids. Vibrations are introduced into the slimy liquid for reducing its viscosity to enable the liquid to more readily gravitate through a screen basket of the separator.

10 Claims, 2 Drawing Sheets

5,118,427

PROCESS AND APPARATUS FOR THE SEPARATION OF SOLIDS FROM SLIMY LIQUIDS BY MEANS OF PRESS SCREW SEPARATORS

BACKGROUND OF THE INVENTION

The invention relates to a process and apparatus for the separation of solids from slimy liquids, such as slimy manure, by means of separators in which the pressing power is built up by means of a screw. In particular, the process and apparatus are used for the solid-liquid separation of settled slimy liquid cattle manure and similar suspensions difficult to handle.

The use of liquid manure removal installations has proved itself in the intensive raising of animals, and the method is being applied increasingly. In view of this development, methods were devised for the separation of liquid manure into solids and a liquid phase.

In a report of the Institut fur Technologie der Bundesforschungsanstalt fur Landwirtschaft (Institute for Technology, Federal Research Establishment for Agriculture), Braunschweig-Volkenrode, published in Grundl. Landtechnik, Vol 37 (1987), No 3, pg. 98-107, R. Krause and R. Ahlers described the problem of liquid manure removal and the importance of the solid-liquid separation of liquid manure under the title of "Process Technology of the Separation of Liquid Manure". The advantages and disadvantages of various machines were also set forth and the machines compared with each other.

That publication is the basis of the description of the characteristics of the known technical solutions and the critical analysis presented in the European Patent Application No. 89/119460.7 entitled "Process for the Dewatering of Solids Suspended in Water and a Press Screw Separator Therefor".

The "Journal Series for Concrete Construction Information" of the Beton Publishing Co. also described the principles of separation in a pamphlet entitled "Barn Manure", 1988 pg. 102-106.

However, in actual operation it was found that the value of more than 30% dry substance content required for composting was attained only by decanters and press screw separators of more recent design, and even those machines were not effective with certain types of liquid manure. In particular, with settled liquid cattle manure originating in animal raising facilities with summer grass feeding and similar difficult-to-handle slimy suspensions, known decanters and press screw separators produced no satisfactory results.

In decanters, the slimy substances prevented adequate dewatering even with the use of high centrifugal forces.

In press screw separators, no adequate gravity dewatering through the openings of the screen basket at a corresponding viscosity is obtained, so the slimy mixture cannot be properly seized by the screw for further dewatering in the compression zone.

An object of the present invention is to open up the field of the separation of solids from slimy liquids to screw presses and press screw separators so that these simple and robust machines may be used in a field in which they had heretofore not been capable of use.

The need for the invention arises, because under the conditions of a farming operation, only simple and robust machines may be used, such as machines in which the pressing power is generated by a screw.

SUMMARY OF THE INVENTION

The solid-liquid mixtures with which the present invention is concerned are "non-newtonian" liquids. That means that the viscosity of the mixture in a strongly agitated state is lower than when in a state of slight agitation or the absence of agitation.

A process aspect of the present invention involves introducing a slimy liquid into a press screw separator having a screen basket Vibrations are introduced into the slimy liquid for reducing the viscosity thereof to promote a gravity discharge of liquid through the screen basket. The vibrations are preferably introduced into the slimy liquid within a charging space of the separator situated upstream of the screen basket.

An apparatus aspect of the invention involves an apparatus which performs the previously mentioned steps. The vibrations are introduced by means of a vibrator mounted outside the housing, and a transducer mounted inside the housing. A vibration transmitting structure passes through an opening of the housing to interconnect the vibrator and transducer. The vibration transmitting structure includes an elastic membrane which is arranged across the opening. The membrane transmits vibrations and acts as a seal to prevent the escape of liquid from the housing.

Preferably, the vibrator is mounted for movement relative to the housing, and an elastic damper is interposed between the vibrator and the housing.

The problem of separation is therefore solved according to the invention in that vibrations are introduced into the slimy liquid. The viscosity thereof is thereby reduced to the extent that the liquid is able to flow out by gravity through the openings of the screen basket. The remaining solid content thus becomes so concentrated that the screw is able to seize the solid particles and build up a certain compression power in the compression zone, leading to the further precipitation of the slimy liquid from solid material.

The apparatus according to the invention comprises a vibrator and a device to introduce the vibrations into the liquid. A vibrating membrane separates the external vibrator from the inner space, thereby preventing the exit of the liquid to be treated.

To obtain vertical vibration, vibrators with directional or nondirectional vibration may be used. If vibrators with non-directional vibration are used, suitable stabilizers must be provided as guides.

BRIEF DESCRIPTION OF THE DRAWINGS

The objects and advantages of the invention will become apparent from the following detailed description of a preferred embodiment thereof in connection with the accompanying drawings, in which like numerals designate like elements, and in which.

DETAILED DESCRIPTION OF PREFERRED EMBODIMENTS OF THE INVENTION

Figure 1:
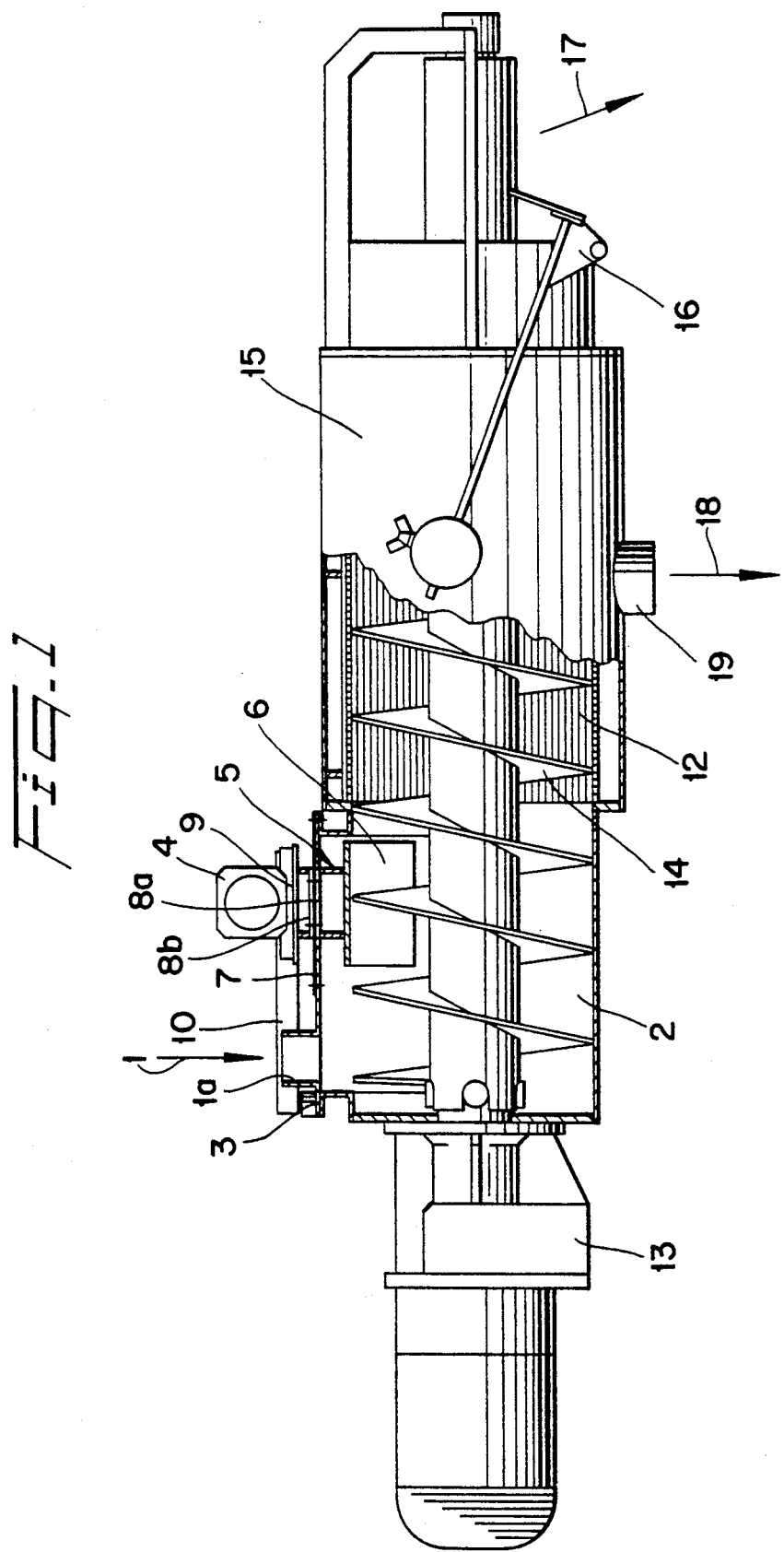
FIG. 1 is a side elevational view of a press screw separator according to the present invention, with a portion of the housing thereof broken away to expose the interior of the separator.
Figure 2:
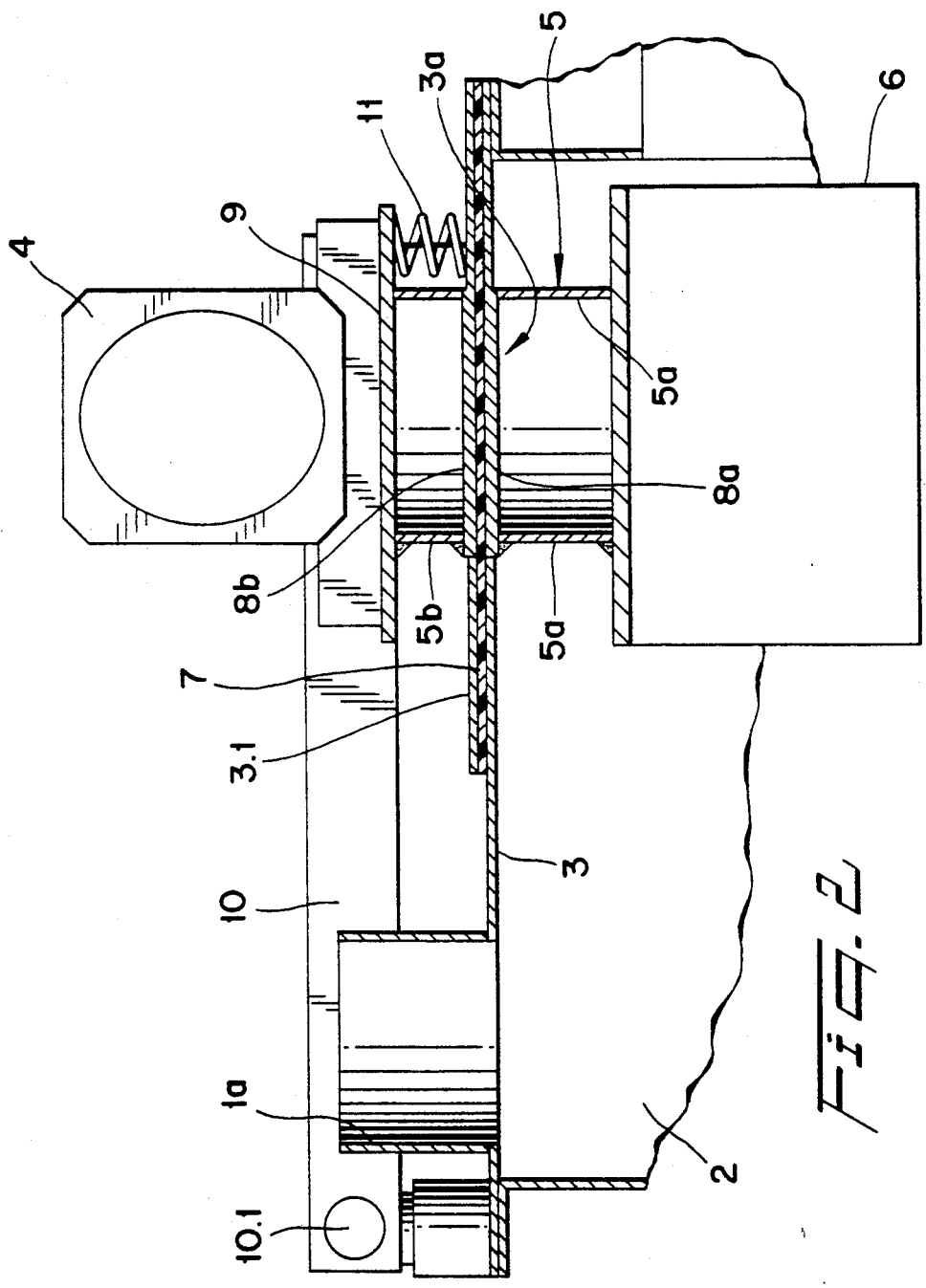
FIG. 2 is a fragmentary longitudinal sectional view taken through an inlet portion of the housing of the separator depicted in FIG. 1.

FIGS. 1 and 2 show a press screw separator having an inlet port 1a for receiving slimy liquid manure which is pumped in a direction 1 from an animal housing installation. The port 1a, which leads to a charging space 2 of the separator, is formed on a cover plate 3. The cover plate is fixed to the separator housing and carries a vibrator 4. The vibrator 4, which is preferably of a conventional basic type creating random or non-directional vibrations, is mounted on a fastening plate 9, which, in turn, is connected to the free ends of stabilizer arms 10 (only one arm being shown). The stabilizer arms 10 are supported by means of a pivot connection 10.1 to the cover 3. There may be two, parallel stabilizer arms, the free ends of which straddle the vibrator. The cover 3 has an opening 3a which is closed off by a membrane 7. The membrane is affixed to the cover by a circumferential frame 3.1, which clamps the periphery of the membrane. The frame 3.1 can be bolted to the housing of the separator.

Vibrations from the vibrator are transmitted directly to the manure disposed within the charging space 2 by means of a transducer 6 which is disposed within the charging space 2 and operably connected to the vibrator by a clamp fastener 5 mounted to the membrane. The clamp fastener comprises lower vertical ribs 5a and upper vertical ribs 5b which are attached to lower and upper mounting plates 8a, 8b, respectively. The mounting plates 8a, 8b are suitably fastened to the membrane 7, e.g., by bolts. The upper ribs 5b are affixed to the fastening plate 9, and the lower ribs 5a are affixed to the transducer.

Vibrations created by the vibrator are transmitted via the upper ribs 5b to the membrane, which is induced to vibrate, thereby transmitting the vibrations to the transducer 6 via the lower ribs 5a. Thus, the slimy liquid in the charging space 2 is vibrated.

The free ends of the stabilizer arms 10 are supported by means of an elastic damper such as a rubber buffer or springs 11, which are interposed between the arms 10 and the circumferential frame 3.1.

In operation, vibrations from the vibrator are introduced into the slimy manure within the charging space 2 to reduce the viscosity of the slimy manure. As noted earlier, the slimy manure is "non-newtonian" and thereby exhibits reduced viscosity when placed in a highly agitated or vibrated state. The lowered viscosity characteristic is maintained as the manure travels through an entry zone of a cylindrical screen basket 12. Due to the lowered viscosity, the flow behavior of the slimy manure is improved such that it more readily gravitates outwardly through the openings of the screen basket. The remaining dewatered substance within the pressing space becomes more concentrated and can thus be seized by the motor driven screw 14 and effectively compressed within the compression zone 15.

The discharge regulator 16 affects the necessary strength of the solid plug. While the solid matter drops out merely as a crumbling product in direction 17, the screened liquid drains from the machine through the fitting 19 in direction 18.

The present invention enables slimy liquids, such as slimy manure, to be effectively dewatered in a press screw separator. The vibrations applied to the manure reduce its viscosity such that it more readily escapes through the screen. The remaining solids thus achieve a sufficiently high concentration value to be capable of being effectively compressed in the compression zone. The discharged solids can thus achieve the required 30% dry substance content.

Although the vibrator is of the type which creates non-directional vibration, a vibrator could instead be used which creates directional vibrations, i.e., wherein the vibrations occur in a particular direction.

Although the present invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. A process for the separation of solids from slimy liquid comprising the steps of introducing the slimy liquid into a press screw separator having a screen basket, introducing vibrations into the slimy liquid for reducing the viscosity thereof to promote a gravity discharge of the liquid through the screen basket.

2. A process according to claim 1, wherein said separator includes a charging space located upstream of said screen basket, the vibrations are introduced into the slimy liquid within said charging space.

3. A process according to claim 1, wherein said separator includes a screw conveyor for advancing the slimy liquid through said screen basket, said separator further including a compression zone located downstream of said screw conveyor and arranged such that solids which have been dewatered while being advanced along said screw conveyor are compressed in said compression zone.

4. A press screw separator for the separation of solids from slimy liquids, said separator including a housing having inlet means for receiving slimy liquid, a cylindrical screen basket disposed downstream of said inlet means for the gravity separation of liquid, a motor-driven screw for feeding the slimy liquid into said screen basket, and vibration means for introducing vibrations into the slimy liquid downstream of said inlet means for reducing the viscosity of the slimy liquid to promote a gravity discharge of the liquid through said screen basket.

5. A press screw separator according to claim 4, wherein said separator includes a charging space disposed between said inlet means and said screen basket, said vibration means arranged to introduce vibrations into the slimy liquid within said charging space.

6. Apparatus according to claim 4, wherein said vibration means includes a vibrator mounted outside of said housing, and a transducer mounted inside of said housing, and vibration transmitting means passing through an opening in said housing and interconnecting said vibrator and said transducer, said vibration transmitting means including an elastic membrane arranged across said opening to prevent the escape of liquid from said housing.

7. Apparatus according to claim 6, wherein said membrane is mounted at its periphery to said housing, said vibration transmitting means including first means connecting said vibrator with said membrane, and second means interconnecting said membrane with said transducer.

8. Apparatus according to claim 6 including means mounting said vibrator for movement relative to said housing, and elastic damping means interposed between said vibrator and said housing.

9. Apparatus according to claim 8, wherein said means mounting said vibrator comprises a stabilizer arm pivotably mounted at one end to said housing and carrying said vibrator at the other end.

10. Apparatus according to claim 4, wherein said vibrator generates non-directional vibrations.

* * * * *